(12) United States Patent
Aldhaher

(10) Patent No.: US 12,456,930 B2
(45) Date of Patent: Oct. 28, 2025

(54) POWER INVERTER FOR USE WITH A HAIR STYLING OR HAIR CARE APPLIANCE

(71) Applicant: Dyson Technology Limited, Wiltshire (GB)

(72) Inventor: Samer Aldhaher, Bath (GB)

(73) Assignee: Dyson Technology Limited, Malmesbury (GB)

( * ) Notice: Subject to any disclaimer, the term of this patent is extended or adjusted under 35 U.S.C. 154(b) by 204 days.

(21) Appl. No.: 18/563,846

(22) PCT Filed: May 10, 2022

(86) PCT No.: PCT/GB2022/051183
§ 371 (c)(1),
(2) Date: Nov. 22, 2023

(87) PCT Pub. No.: WO2022/248826
PCT Pub. Date: Dec. 1, 2022

(65) Prior Publication Data
US 2024/0235425 A1    Jul. 11, 2024

(30) Foreign Application Priority Data
May 27, 2021    (GB) ...................................  2107563

(51) Int. Cl.
*H02M 7/5387*    (2007.01)
*A45D 2/36*      (2006.01)
(Continued)

(52) U.S. Cl.
CPC ........ *H02M 7/53871* (2013.01); *A45D 2/367* (2013.01); *H02M 1/0048* (2021.05);
(Continued)

(58) Field of Classification Search
CPC .... H02M 7/53871; H02M 1/12; H02M 7/493; H02M 7/4815; H02M 7/5387;
(Continued)

(56) References Cited

U.S. PATENT DOCUMENTS 2,526,283 A    10/1950    Schmidt
2,561,609 A    7/1951    Briggs
(Continued)

FOREIGN PATENT DOCUMENTS

CN    108065562 A    5/2018
DE    3148538 A1    6/1983
(Continued)

OTHER PUBLICATIONS

Anonymous, "Power Inverter Circuits for High Frequency Dielectric Heating of Hair", 19 pages.
(Continued)

*Primary Examiner* — Yusef A Ahmed
(74) *Attorney, Agent, or Firm* — Tucker Ellis LLP

(57) ABSTRACT

A power inverter is described that includes an input for connection to a DC voltage, a first switch, a second switch, and a controller for controlling the switches. Each of the switches is connected between the input and ground. The power inverter further includes a first network and a second network. The first network is connected at one end to the first switch and at another end to the second switch. The first network includes a capacitor, an inductor and a capacitor connected in series. The second network is connected at one end to an end of the first network and at another end to the other end of the first network. The second network includes a first sub-network, an output capacitor, and a second sub-network connected in series, where each of the sub-
(Continued)

networks includes a capacitor and an inductor connected in series. A pair of outputs are then connected across the output capacitor.

15 Claims, 5 Drawing Sheets

(51) Int. Cl.
  *H02M 1/00* (2006.01)
  *H02M 1/12* (2006.01)
  *H02M 7/48* (2007.01)
  *H02M 7/493* (2007.01)
(52) U.S. Cl.
  CPC ........... *H02M 1/0058* (2021.05); *H02M 1/12* (2013.01); *H02M 7/4815* (2021.05); *H02M 7/5387* (2013.01); *H02M 7/493* (2013.01)
(58) Field of Classification Search
  CPC .. H02M 1/0048; H02M 1/0058; A45D 2/367; A45D 2001/045; A45D 2/001; A45D 1/04; H05B 6/62; H05B 6/50
  See application file for complete search history.

(56) References Cited

U.S. PATENT DOCUMENTS

| | | | |
|---|---|---|---|
| 4,627,451 A | 12/1986 | Chang | |
| 4,674,025 A | 6/1987 | Edwards | |
| 5,475,580 A * | 12/1995 | Noro | H02M 3/33571 363/16 |
| 5,668,715 A * | 9/1997 | Hong | H02M 7/537 455/182.1 |
| 5,673,188 A | 9/1997 | Lusher et al. | |
| 5,946,208 A * | 8/1999 | Yamamoto | H02M 7/538 363/41 |
| 7,586,066 B2 | 9/2009 | Bell | |
| 9,038,645 B2 | 5/2015 | Wandke et al. | |
| 9,572,412 B2 | 2/2017 | Vic et al. | |
| 9,775,419 B2 | 10/2017 | Genain et al. | |
| 9,854,892 B2 | 1/2018 | Moore et al. | |
| 11,631,999 B2 * | 4/2023 | Danilovic | H02M 7/217 307/104 |
| 11,771,192 B2 | 10/2023 | Moore et al. | |
| 11,771,193 B2 | 10/2023 | Vic et al. | |
| 11,916,404 B1 * | 2/2024 | Pries | B60L 53/122 |
| 2006/0158911 A1 * | 7/2006 | Lincoln | H02M 1/32 363/56.01 |
| 2009/0116266 A1 * | 5/2009 | Lai | H02M 7/493 363/40 |
| 2010/0101599 A1 | 4/2010 | Choi | |
| 2010/0242985 A1 | 9/2010 | Kaizuka | |
| 2011/0051473 A1 * | 3/2011 | Glaser | H02M 3/1588 363/133 |
| 2011/0108051 A1 | 5/2011 | Yahnker et al. | |
| 2012/0287678 A1 * | 11/2012 | Xu | H02M 3/158 363/21.02 |
| 2013/0152959 A1 | 6/2013 | Genain et al. | |
| 2013/0306100 A1 | 11/2013 | Wandke et al. | |
| 2013/0319452 A1 | 12/2013 | Joo et al. | |
| 2013/0343107 A1 * | 12/2013 | Perreault | H03F 3/211 363/67 |
| 2014/0092662 A1 * | 4/2014 | Chen | H02M 7/5387 363/132 |
| 2015/0107616 A1 | 4/2015 | Bormashenko et al. | |
| 2015/0372615 A1 * | 12/2015 | Ayyanar | H02M 7/48 363/131 |
| 2016/0241163 A1 * | 8/2016 | Imai | H02M 3/335 |
| 2016/0294217 A1 * | 10/2016 | Mi | H02J 50/05 |
| 2016/0352235 A1 * | 12/2016 | Imai | H02M 3/33569 |
| 2017/0025970 A1 * | 1/2017 | Horst | H02M 7/1555 |
| 2017/0085189 A1 * | 3/2017 | Madsen | H02M 1/44 |
| 2017/0294840 A1 * | 10/2017 | Madsen | H02M 1/08 |
| 2017/0360174 A1 | 12/2017 | Moore et al. | |
| 2018/0035776 A1 | 2/2018 | Weatherly et al. | |
| 2018/0145608 A1 * | 5/2018 | Lin | H02M 7/53 |
| 2018/0198382 A1 * | 7/2018 | Zhang | H02M 3/1582 |
| 2018/0367104 A1 * | 12/2018 | Seebacher | H01L 25/072 |
| 2019/0007490 A1 * | 1/2019 | Raymond | H03F 1/0205 |
| 2020/0085084 A1 | 3/2020 | Piel et al. | |
| 2020/0106367 A1 * | 4/2020 | Bendani | H02M 3/33576 |
| 2020/0336020 A1 * | 10/2020 | Chen | H02M 7/537 |
| 2021/0021236 A1 * | 1/2021 | Surakitbovorn | H03F 1/56 |
| 2021/0052056 A1 | 2/2021 | Vic et al. | |
| 2021/0408923 A1 * | 12/2021 | Sun | H02M 3/33573 |
| 2022/0038029 A1 * | 2/2022 | Prakash | H02M 1/0058 |
| 2022/0255357 A1 * | 8/2022 | Aldhaher | H02M 7/537 |
| 2023/0068053 A1 * | 3/2023 | Chang | H02M 1/0054 |
| 2023/0181429 A1 | 6/2023 | Moore et al. | |
| 2024/0215125 A1 * | 6/2024 | Aldhaher | A45D 1/06 |
| 2024/0215699 A1 * | 7/2024 | Carlyle | A45D 2/40 |
| 2024/0225227 A1 * | 7/2024 | Aldhaher | A45D 1/06 |
| 2024/0225228 A1 * | 7/2024 | Aldhaher | H05B 6/48 |
| 2024/0225229 A1 * | 7/2024 | Lewis | H05B 6/54 |
| 2024/0225230 A1 * | 7/2024 | Lewis | H05B 6/48 |
| 2024/0237161 A1 * | 7/2024 | Carlyle | H05B 6/62 |
| 2024/0237796 A1 * | 7/2024 | Aldhaher | H05B 6/62 |
| 2024/0237797 A1 * | 7/2024 | Carlyle | A45D 1/06 |

FOREIGN PATENT DOCUMENTS

| | | |
|---|---|---|
| DE | 102009045498 A1 | 4/2011 |
| EP | 0183507 B1 | 2/1989 |
| EP | 2861096 B1 | 8/2016 |
| EP | 2568848 B1 | 11/2016 |
| EP | 3236797 A2 | 11/2017 |
| EP | 3505004 | 7/2019 |
| GB | 0589911 A | 7/1947 |
| GB | 0611710 A | 11/1948 |
| GB | 0617246 A | 2/1949 |
| GB | 0617274 | 2/1949 |
| GB | 0704364 A | 2/1954 |
| GB | 2533602 A | 6/2016 |
| GB | 2535504 A | 8/2016 |
| GB | 2569647 A | 6/2019 |
| GB | 2567450 B | 7/2020 |
| JP | 3590155 B2 | 11/2004 |
| KR | 10-1036422 B1 | 5/2011 |
| KR | 10-2015-0060474 A | 6/2015 |
| KR | 10-2020-0090280 A | 7/2020 |
| KR | 20-2021-0000744 U | 4/2021 |
| WO | 2013004519 A1 | 1/2013 |
| WO | 2014/068795 A1 | 5/2014 |
| WO | 2016/102972 A2 | 6/2016 |
| WO | 2019/122850 A1 | 6/2019 |
| WO | 2021/046649 A1 | 3/2021 |
| WO | 2021/156162 A1 | 8/2021 |
| WO | 2022/248831 A1 | 12/2022 |
| WO | 2022/248833 A1 | 12/2022 |

OTHER PUBLICATIONS

Examination Report received for GB Application No. 2107567.6, mailed on Nov. 2, 2023, 3 pages.
Examination Report received for GB Application No. 2107570.0, mailed on Sep. 11, 2023, 2 pages.
International Search Report and Written Opinion received for PCT Patent Application No. PCT/GB2022/051190, mailed on Jul. 29, 2022, 12 pages.
International Search Report and Written Opinion received for PCT Patent Application No. PCT/GB2022/051182, mailed on Jul. 25, 2022, 11 pages.
International Search Report and Written Opinion received for PCT Patent Application No. PCT/GB2022/051183, mailed on Jul. 26, 2022, 11 pages.
International Search Report and Written Opinion received for PCT Patent Application No. PCT/GB2022/051184, mailed on Jul. 27, 2022, 10 pages.

(56) References Cited

OTHER PUBLICATIONS

International Search Report and Written Opinion received for PCT Patent Application No. PCT/GB2022/051185, mailed on Jul. 25, 2022, 11 pages.
International Search Report and Written Opinion received for PCT Patent Application No. PCT/GB2022/051186, mailed on Jul. 22, 2022, 12 pages.
International Search Report and Written Opinion received for PCT Patent Application No. PCT/GB2022/051187, mailed on Jul. 27, 2022, 12 pages.
International Search Report and Written Opinion received for PCT Patent Application No. PCT/GB2022/051188, mailed on Jul. 27, 2022, 9 pages.
International Search Report and Written Opinion received for PCT Patent Application No. PCT/GB2022/051189, mailed on Jul. 27, 2022, 10 pages.
International Search Report and Written Opinion received for PCT Patent Application No. PCT/GB2022/051191, mailed on Jul. 29, 2022, 11 pages.
Search Report received for GB Application No. 2107564.3, mailed on Nov. 17, 2021, 2 pages.
Search Report received for GB Application No. 2107566.8, mailed on Nov. 17, 2021, 2 pages.
Search Report received for GB Application No. 2107562.7, mailed on Nov. 17, 2021, 2 pages.
Search Report received for GB Application No. 2107563.5, mailed on Nov. 11, 2021, 1 page.
Search Report received for GB Application No. 2107565.0, mailed on Nov. 17, 2021, 2 pages.
Search Report received for GB Application No. 2107567.6, mailed on Oct. 11, 2021, 1 page.
Search Report received for GB Application No. 2107568.4, mailed on Sep. 28, 2021, 2 pages.
Search Report received for GB Application No. 2107569.2, mailed on Oct. 6, 2021, 1 page.
Search Report received for GB Application No. 2107570.0, mailed on Sep. 16, 2021, 1 page.
Search Report received for GB Application No. 2107571.8, mailed on Nov. 17, 2021, 2 pages.

\* cited by examiner

POWER INVERTER FOR USE WITH A HAIR STYLING OR HAIR CARE APPLIANCE

CROSS-REFERENCE TO PRIOR APPLICATIONS

This application is a § 371 National Stage Application of PCT International Application No. PCT/GB2022/051183 filed May 10, 2022, which claims the priority of United Kingdom Application No. 2107563.5, filed May 27, 2021, each of which are herein incorporated by reference in their entirety.

FIELD OF THE INVENTION

The present invention relates to a power inverter.

BACKGROUND OF THE INVENTION

Certain applications that use magnetic and/or electric fields to transfer energy wirelessly, such as induction heating, dielectric heating, plasma generation and wireless charging, may benefit from operating at MHz frequencies. This is because better energy coupling may be achieved at MHz frequencies compared to kHz frequencies. However, operating at MHz frequencies presents challenges in terms of the power electronics required to generate the alternating voltage necessary to drive the coils or electrodes.

SUMMARY OF THE INVENTION

The present invention provides a power inverter comprising: an input for connection to a DC voltage; a first inductor and a second inductor, each of the inductors having a first terminal connected to the input and a second terminal; a first switch having a first terminal connected to the second terminal of the first inductor and a second terminal connected to ground; a second switch having a first terminal connected to the second terminal of the second inductor and a second terminal connected to ground; a first capacitor connected in parallel to the first switch; a second capacitor connected in parallel to the second switch; a first network having a first terminal connected to the first terminal of the first switch and a second terminal connected to the first terminal of the second switch, the first network comprising a third capacitor, a third inductor and a fourth capacitor connected in series; a fourth inductor having a first terminal connected to the first terminal of the first network and a second terminal; a fifth inductor having a first terminal connected to the first terminal of the first network and a second terminal; a fifth capacitor having a first terminal connected to the second terminal of the fourth inductor, and a second terminal connected to the second terminal of the fifth inductor; a second network having a first terminal connected to the first terminal of the fifth capacitor and a second terminal connected to the second terminal of the fifth capacitor, the second network comprising a first sub-network, an output capacitor, and a second sub-network connected in series, wherein each of the sub-networks comprises a capacitor and an inductor connected in series; a pair of outputs, each of the outputs connected to a terminal of the output capacitor; and a controller for controlling the first and second switches.

With the power inverter of the present invention, an alternating voltage is generated at the outputs. The frequency of the output voltage is then defined by the switching frequency of the switches. The power inverter comprises a number of resonant networks and sub-networks. As a result, relatively high efficiencies may be achieved at MHz frequencies.

DC-to-AC power inverters that employ conventional full-bridge topologies are typically efficient at kHz frequencies. However, as the frequency of operation increases to MHz, switching losses increase significantly and parasitic inductances and capacitances limit the performance of such power inverters.

The power inverter of the present invention, on the other hand, comprises a single pair of switches. As a result, switching losses may be reduced in comparison to a full-bridge topology. Moreover, through appropriate selection of the inductances and capacitances of the various components, zero-voltage switching may be achieved. Additionally, parasitic inductances and capacitances are absorbed and do not therefore limit or impact the performance of the power inverter.

The controller may switch the switches at duty cycles of 0.5±5%. As a result, the power delivered to the outputs is well balanced over both sides of the power inverter. By contrast, if the duty cycle were outside this range, power delivery would be unbalanced, i.e. one side of the power inverter would deliver more power than the other side. As a result, the efficiency of the power inverter would decrease due to increased losses on one side of the inverter, and one side of the power inverter will become hotter. Additionally, the AC voltage at the outputs will have a higher harmonic content.

For similar reasons, the ratio of one or more of (i) the capacitances of the first and second capacitors, (ii) the capacitances of the third and fourth capacitors, (iii) the inductances of the fourth and fifth inductors, and (iv) the inductances of the inductors of the first and second sub-networks may be 1.0±5%.

The controller may switch the switches at a switching frequency of at least 10 Mhz. More particularly, the controller may switch the switches at a switching frequency of at least 20 Mhz. By operating at such high frequencies, better energy coupling may be achieved between the power inverter and the load to which energy is transferred.

The efficiency of the power inverter may be increased through appropriate selection of the inductances and capacitances of the various components. In particular, switching losses may be reduced. Indeed, zero-voltage switching may be achieved. To this end, the power inverter may comprise one or more of the following optional features.

Optionally, the first network may have a resonant frequency of $\omega_1$, the controller may switch the switches at a switching frequency of $\omega_S$, and the ratio of $\omega_1/\omega_S$ may be 0.64±20%.

Optionally, the first capacitor may have a capacitance C1, the second capacitor may have a capacitance C2, the third capacitor may have a capacitance C3, the fourth capacitor may have a capacitance C4, and the ratios C3/C1 and C4/C2 may each be 1.395±20%.

Optionally, the third inductor may have an inductance L3, the fourth inductor may have an inductance L4, the fifth inductor may have an inductance L5, the inductor of the first sub-network may have an inductance L6, and the inductor of the second sub-network may have an inductance L7, where L6=L4−0.145*L3±20% and L7=L5−0.145*L3±20%.

Optionally, the controller may switch the switches at a switching frequency of $\omega_S$, the fifth capacitor may have a capacitance C5, the inductor of the first sub-network may have an inductance L6, and the inductor of the second sub-network may have an inductance L7, where each of L6 and L7 may be equal to $2/(\omega_S^2 \cdot C5) \pm 20\%$.

Each of the sub-networks may comprise a further inductor connected in series with the inductor and the capacitor, and the further inductor of the first and second sub-networks may be mutually coupled. This then has the benefit that the mutual inductance may compensate for changes in the reactance of the power inverter that may arise during use. For example, the reactance of the load across the outputs of the power inverter may vary during use, and the power inverter may be configured such that the coupling coefficient of the further inductors also varies such that the net change in reactance is reduced. For example, as the load capacitance increases or the load inductance decreases, the power inverter may be configured such that coupling coefficient, and thus the mutual inductance, increases to compensate.

The further inductors may have a coupling coefficient of no greater than 0.5. As a result, overcoupling of the further inductors may be avoided, which might otherwise adversely affect the behaviour of the power inverter during power transience, e.g. power on and off.

The controller may switch the switches at a switching frequency of $\omega_S$, the further inductor of the first sub-network may have an inductance L8, the further inductor of the second sub-network may have an inductance L9, the further inductors may have a coupling coefficient k, and the output capacitor may have a capacitance C8, where $$C8 = \frac{1}{\omega_S^2(L8 + L9 + 2k\sqrt{L8 \cdot L9})} \pm 20\%$$

The coupling efficient may be adjustable. As a result, the mutual inductance may be adjusted so as to compensate for changes in the reactance of the power inverter. As noted above, the reactance of the load across the outputs of the power inverter may vary during use. The coupling coefficient of the further inductors may then be adjusted such that the net change in reactance is reduced.

The further inductors may be moveable relative to one another to adjust the coupling coefficient. This then provides a convenient means for adjusting the coupling coefficient. The coupling coefficient may be inversely proportional to a separation of the further inductors. As a result, the coupling coefficient increases when the further inductors move closer to one another, and decreases when the further inductors move away from one another.

The present invention also provides a first power inverter and a second power inverter as described in any one of the preceding paragraphs, wherein the first power inverter outputs a first alternating voltage, the second power inverter outputs a second alternating voltage, the second alternating voltage has the same frequency as the first alternating voltage, and the second alternating voltage has a phase angle of 180 degrees relative to the first alternating voltage.

For a given input voltage, the power system is capable of transferring a higher output power to the load in comparison to a single power inverter. The same output power could conceivably be achieved with a single power inverter by employing a higher input voltage. However, the single inverter would then suffer from higher power losses. With the power system of the present invention, a given output power may be achieved more efficiently.

Each of the sub-networks may comprise a further inductor connected in series with the inductor and the capacitor. The further inductors of the first sub-networks of the first and second power inverters may be mutually coupled, and the further inductors of the second sub-networks of the first and second power inverters may be mutually coupled. By mutually coupling the further inductors of the two power inverters, the mutual inductances may compensate for changes in the reactance of the power system that may arise during use. For example, the reactance of the load across the outputs of the power system may vary during use, and the power system may be configured such that the coupling coefficient of each pair of further inductors also varies such that the net change in reactance is reduced. For example, as the load capacitance increases or the load inductance decreases, the power system may be configured such that coupling coefficients increase and thus the mutual inductances increase to compensate.

The further inductors of the first sub-networks, and the further inductors of the second sub-networks may have coupling coefficients of no greater than 0.5. This then has the benefit that overcoupling of each pair of further inductors may be avoided, which might otherwise adversely affect the efficiency of the power inverter and/or increase the harmonic content of the AC voltage at the outputs.

The power system may comprise a common controller for controlling the switches of the two power inverters.

The controller(s) may switch the switches of the first and second power inverters at a switching frequency of $\omega_S$, each of the further inductors of the first sub-networks may have an inductance L8, the further inductors of the first sub-networks may have a coupling coefficient k, and each of the output capacitors of the first and second power inverters may have a capacitance C8, where $$C8 = \frac{1}{\omega_S^2(2L8 + 2kL8)} \pm 20\%$$

The coupling coefficients may be adjustable. As a result, the mutual inductance of each pair of further inductors may be adjusted so as to compensate for changes in the reactance of the power system. As noted above, the reactance of the load across the outputs of the power system may vary during use. The coupling coefficients of the further inductors may then be adjusted such that the net change in reactance is reduced.

The further inductors of the first power inverter may be moveable relative to the further inductors of the second power inverter to adjust the coupling coefficients. This then provides a convenient means for adjusting the coupling coefficients. The coupling coefficients may be inversely proportional to a separation of each pair of the further inductors. As a result, the coupling coefficient of each pair of further inductors increases when the further inductors move closer to one another, and decreases when the further inductors move away from one another.

The present invention further provides a haircare styling appliance comprising a plurality of electrodes and a power inverter or a power system as described in any one of the preceding paragraphs, wherein each of the electrodes is connected to a respective output.

The hair styling appliance may therefore be used to heat hair between the electrodes dielectrically. Consequently, in contrast to a conventional styling appliance having heating plates, the hair may be heated without first having to heat surfaces of the appliance. The appliance is therefore potentially safer. Additionally, in comparison to a conventional styling appliance having heating plates, the appliance of the present invention is potentially more efficient. With a conventional styling appliance, the electrical power drawn by the heating plates can be significant even when there is no hair between the plates. With the appliance of the present invention, on the other hand, relatively little power is likely to be drawn by the electrodes in the absence of hair. This is because the power drawn by the electrodes depends on the impedance of the electrodes, which in turn depends on the dielectric constant of the material between the electrodes. The dielectric constant of air is around 1 and therefore, in the absence of hair, the power drawn by the electrodes is likely to be relatively low.

By employing the power inverter or power system to drive the electrodes, an electric field may be generated between the electrodes at MHz frequencies in a relatively efficient way. By driving the electrodes at MHz frequencies, relatively good coupling of the energy of the electric field with the hair may be achieved. As a result, quicker heating and/or improved styling of the hair may be achieved.

The appliance may comprise a pair of arms that are moveable relative to one another, and the electrodes may be attached to or housed within the arms. Where the power inverter or the power system comprises mutually-coupled inductors, the coupling coefficient may vary as the separation of the arms varies. In particular, the coupling coefficient (and thus the mutual inductance) may decrease as the separation of the arms (and thus the separation of the electrodes) increases. As the separation of the arms increases, the capacitance of the electrodes decreases and thus the reactance increases. By decreasing the coupling coefficient in response to an increase in the separation of the arms, the mutual inductance of the inductors and thus the reactance decreases. Accordingly, changes in the capacitance of the electrodes may be offset by changes in the mutual inductance of the coupled inductors such that the net change in reactance is reduced.

BRIEF DESCRIPTION OF THE DRAWINGS

Embodiments will now be described, by way of example, with reference to the accompanying drawings in which.

DETAILED DESCRIPTION OF THE INVENTION

Figure 1:
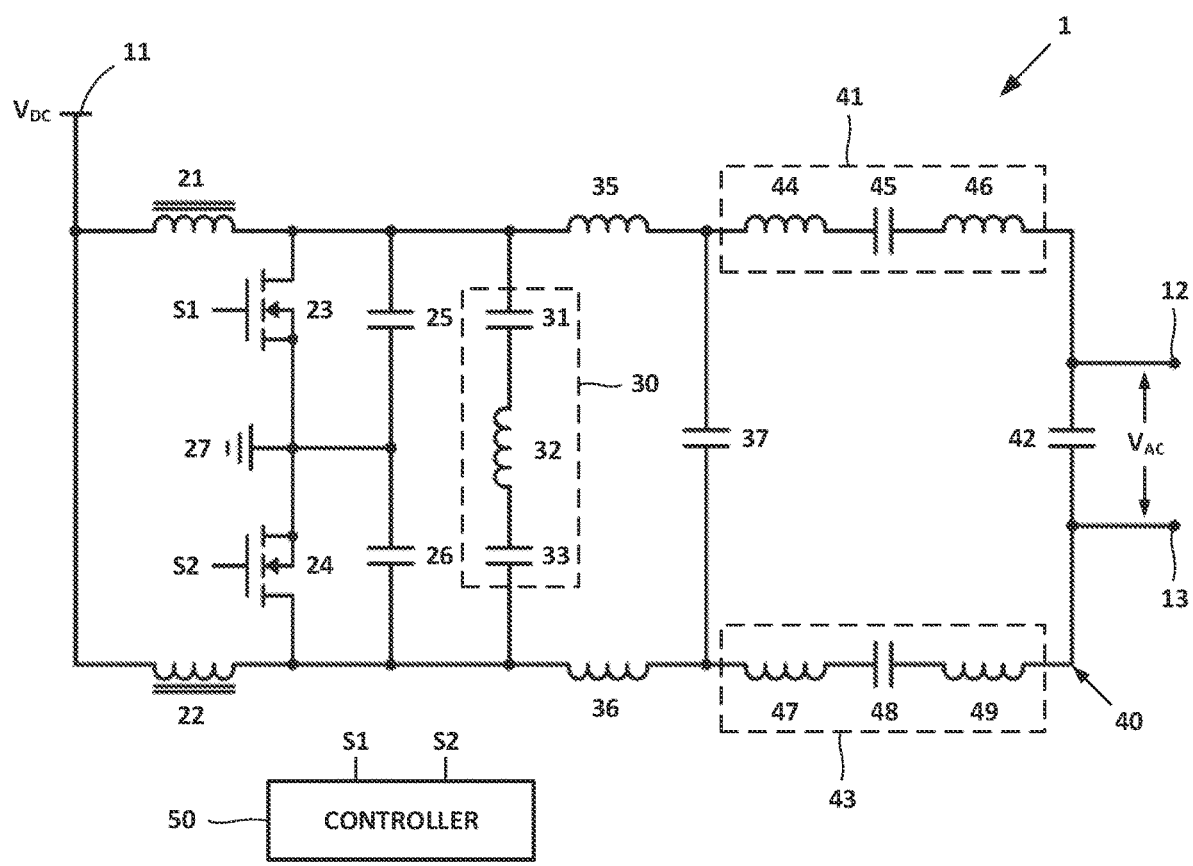
FIG. 1 is a circuit diagram of a power inverter.

The power inverter 1 of FIG. 1 comprises an input 11 for connection to a DC voltage, and a pair of outputs 12,13 for connection to a load.

The power inverter 1 further comprises a first inductor 21, a second inductor 22, a first switch 23, and second switch 24, a first capacitor 25 and a second capacitor 26. Each of the inductors 21,22 has a first terminal connected to the input 11 and a second terminal. The first switch 23 has a first terminal connected to the second terminal of the first inductor 21 and a second terminal connected to ground 27. Similarly, the second switch 24 has a first terminal connected to the second terminal of the second inductor 22 and a second terminal connected to ground 27. The first inductor 21 and the first switch 23 are therefore connected in series between the input 11 and ground 27. Similarly, the second inductor 22 and the second switch 24 are connected in series between the input 11 and ground 27. The first capacitor 25 is then connected in parallel to the first switch 23, and the second capacitor 26 is connected in parallel to the second switch 24.

The power inverter 1 also comprises a first network 30, a fourth inductor 35, a fifth inductor 36, and a fifth capacitor 37. The first network 30 has a first terminal connected to the first terminal of the first switch 23 and a second terminal connected to the first terminal of the second switch 24. The first network 30 comprises a third capacitor 31, a third inductor 32 and a fourth capacitor 33 connected in series. The fourth inductor 35 has a first terminal connected to the first terminal of the first network 30 and a second terminal connected to a first terminal of the fifth capacitor 37. The fifth inductor 36 has a first terminal connected to the second terminal of the first network 30 and a second terminal connected to the second terminal of the fifth capacitor 37. The fifth capacitor 37 therefore has a first terminal connected to the second terminal of the fourth inductor 35, and a second terminal connected to the second terminal of the fifth inductor 36.

The power inverter 1 further comprises a second network 40 having a first terminal connected to the first terminal of the fifth capacitor 37 and a second terminal connected to the second terminal of the fifth capacitor 37. The second network 40 comprises a first sub-network 41, an output capacitor 42, and a second sub-network connected 43 in series. Each of the sub-networks 41,43 comprises an inductor 44,47, a capacitor 45,48 and a further inductor 46,49 connected in series. The particular order of the components within each sub-network 41,43 is unimportant. Additionally, since the inductor 44,47 and the further inductor 46,49 are connected in series, each sub-network 41,43 could conceivably comprise a single inductor (corresponding to the sum of the two inductors). Each of the outputs 12,13 is connected to a terminal of the output capacitor 42, i.e. a first output 12 is connected to a first terminal of the output capacitor 42, and a second output 13 is connected to a second terminal of the output capacitor 42.

Finally, the power inverter 1 comprises a controller 50 for controlling the first and second switches 23,24, and thus the operation of the power inverter 1. The controller 50 generates switching signals S1,S2 for controlling the switches 23,24. Although not shown, the power inverter 1 may comprise gate drivers for driving the switches 23,24 in response to the switching signals S1,S2 generated by the controller 50.

In operation, the controller 50 switches each of the switches at a duty cycle of 0.5. Moreover, the switching signal S2 of the second switch 24 is phase shifted by 180 degrees relative to the switching signal S1 of the first switch 23. In response, an AC output voltage is generated at the outputs 12,13.

The frequency of the output voltage is defined by the switching frequency of the switches 23,24. The controller 50 switches the switches 23,24 at a switching frequency in the MHz region, resulting in an output voltage having a MHz frequency. By operating at such a high frequency, better energy coupling may be achieved between the power inverter 1 and the load. The controller 50 may switch the switches at a switching frequency of at least 10 MHZ. Indeed, a switching frequency of between 10 MHz and 100 MHz is possible. As a result, good energy coupling may be achieved.

Owing to the particular topology of the power inverter 1, the output voltage has a constant amplitude and phase. That is to say that, for a given input voltage, the amplitude and phase of the output voltage is constant. Moreover, the amplitude and phase of the output voltage remain constant in response to changes in the load. The power inverter 1 therefore acts as a voltage source. As described below, this then has potential advantages in comparison to power inverters for which the output voltage varies in response to changes in the load.

Figure 2:
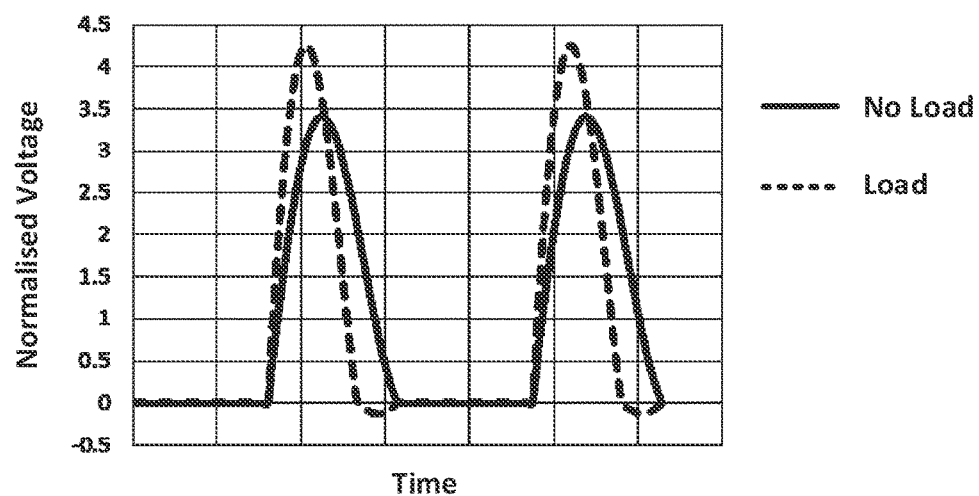
FIG. 2 shows the voltage across a switch of the power inverter, when the power inverter is unloaded and loaded.

In addition to generating an output voltage that (i) has a frequency in the MHz region, and (ii) has a constant amplitude and phase, the components the power inverter 1 shape the voltage across each of the switches 23,24 such that zero or near-zero voltage switching may be achieved. Moreover, zero or near-zero voltage switching may be achieved at different loads. This can be seen in FIG. 2, which shows the voltage across one of the switches 23,24 when unloaded and loaded. By achieving zero or near-zero voltage switching, relatively high efficiencies may be achieved at MHz frequencies.

By contrast, power inverters that employ conventional full-bridge topologies are typically efficient at kHz frequencies. However, as the frequency of operation increases to MHz, switching losses increase significantly and parasitic inductances and capacitances limit the performance of such power inverters. The power inverter 1 described herein, on the other hand, comprises a single pair of switches 23,24. Moreover, through appropriate selection of the inductances and capacitances of the various components, zero-voltage switching may be achieved. Additionally, parasitic inductances and capacitances are absorbed and do not therefore limit or impact the performance of the power inverter 1.

The power inverter 1 has a differential or symmetric topology. Moreover, the inductances of the first and second inductors 21,22, the capacitances of the first and second capacitors 25,26, the capacitances of the third and fourth capacitors 31,33, the inductances of the fourth and fifth inductors 35,36, and the capacitances and inductances of the components of the first and second sub-networks 41,43 are the same. Additionally, as already noted, the controller 50 switches the switches 23,24 at a duty cycle of 0.5. As a result, the electrical power drawn by the load is balanced over both sides (i.e. top and bottom of FIG. 1) of the power inverter 1. Additionally, the shape of the output voltage is symmetrical over each half-cycle.

A relatively well-balanced system may nevertheless be achieved with a degree of tolerance in the capacitances and inductances of the aforementioned components, as well as in the duty cycle of the switches. In particular, the controller 50 may switch the switches 23,24 at duty cycles of 0.5±5%. Furthermore, the ratio of the capacitances of the first and second capacitors 25,26 (i.e. C1/C2), the capacitances of the third and fourth capacitors 31,33 (i.e. C3/C4), the capacitances of the sub-networks (i.e. C6/C7) and/or the inductances of the sub-networks 41,43 may be 1.0±5%. Balanced power transfer is less sensitive to differences in the inductances of the fourth and fifth inductors 35,36, and least sensitive to differences in the inductances of the first and second inductors 21,22. Accordingly, the ratio of the inductances of the first and second inductors 21,22 (i.e. L1/L2) may be 1.0±50%, the ratio of the inductances of the fourth and fifth inductors (i.e. L4/L5) may be 1.0±20%.

If the tolerances are greater than this, the electrical power drawn by the load may be significantly unbalanced. The efficiency of the power inverter 1 would then decrease due to increased losses on one side of the inverter 1. Additionally, one side of the power inverter 1 will become hotter owing to the higher losses, and the output voltage will have a higher harmonic content owing to asymmetry introduced into the voltage waveform by the imbalance.

With the particular topology illustrated in FIG. 1, zero or near-zero voltage switching may be achieved by employing components having capacitances and inductances defined by the following equations.

The first network 30 has a resonant frequency of $\omega_1$ defined by the equation:

$$\omega_1 = \frac{1}{2\pi\sqrt{L3 \cdot \left(\frac{C3 \cdot C4}{C3 + C4}\right)}}$$

where C3 and C4 are the capacitances of the third and fourth capacitors 31,33, and L3 is the inductance of the third inductor 32. The controller 50 switches the switches 23,24 at a switching frequency of $\omega_S$. The ratio of $\omega_1/\omega_S$ is then defined as:

$$\frac{\omega_1}{\omega_S} = 0.64$$

The first capacitor 25 has a capacitance C1, the second capacitor 26 has a capacitance C2, the third capacitor 31 has a capacitance C3, the fourth capacitor has 33 a capacitance C4. The ratios C3/C1 and C4/C2 are then defined as:

$$\frac{C3}{C1} = \frac{C4}{C2} = 1.395$$

The fourth inductor 35 has an inductance L4, the fifth inductor 36 has an inductance L5, the inductor 44 of the first sub-network 41 has an inductance L6, and the inductor 47 of the second sub-network 43 has an inductance L7. L6 and L7 are then defined as:

$$L6 = L4 - 0.145 \cdot L3$$
$$L7 = L5 - 0.145 \cdot L3$$

The fifth capacitor 37 has a capacitance C5 defined as:

$$C5 = \frac{2}{\omega_S^2 L6} = \frac{2}{\omega_S^2 L7}$$

where L6 and L7 are the inductances of the inductors 44,47 of the sub-networks 41,43 and $\omega_S$ is the switching frequency of the switches 23,24.

The capacitors 45,48 of the sub-networks 41,43 are DC blocking capacitors and therefore have a relatively high capacitance, such as 0.1 µF.

The output capacitor 42 has a capacitance C8 defined as:

$$C8 = \frac{1}{\omega_S^2(L8+L9)}$$

where L8 and L9 are the inductances of the further inductors 46,49 of the sub-networks 41,43 and $\omega_S$ is the switching frequency of the switches 23,24.

The equations are normalised to the switching frequency and also to the DC input voltage. That is to say that the equations hold for different switching frequencies and/or different input voltages. Consequently, zero or near-zero voltage switching may be achieved at different switching frequencies and/or different input voltages.

Relatively low switching losses may still be achieved with a degree of tolerance or detuning in one or more of the above equations. In particular, relatively low switching losses may be achieved with a tolerance of ±20% in one or more of the above equations. So, for example, $\omega_1/\omega_S$ may be equal to 0.64±20%, C3/C1 and C4/C2 may each be equal to 1.395±20%, L6 may be equal to L4−0.145*L3±20%, L7 may similarly equal L5−0.145*L3±20%, each of L6 and L7 may be equal to $2/(\omega_S^2 \cdot C5) \pm 20\%$, and C8 may be equal to $1/(\omega_S^2 (L8 \pm L9)) \pm 20\%$.

The power inverter 1 may be used in many different applications for which alternating voltages of MHz frequencies are required or desired. By way of example, the power inverter may be used in induction heating, dielectric heating, plasma generation and wireless charging.

Figure 3:
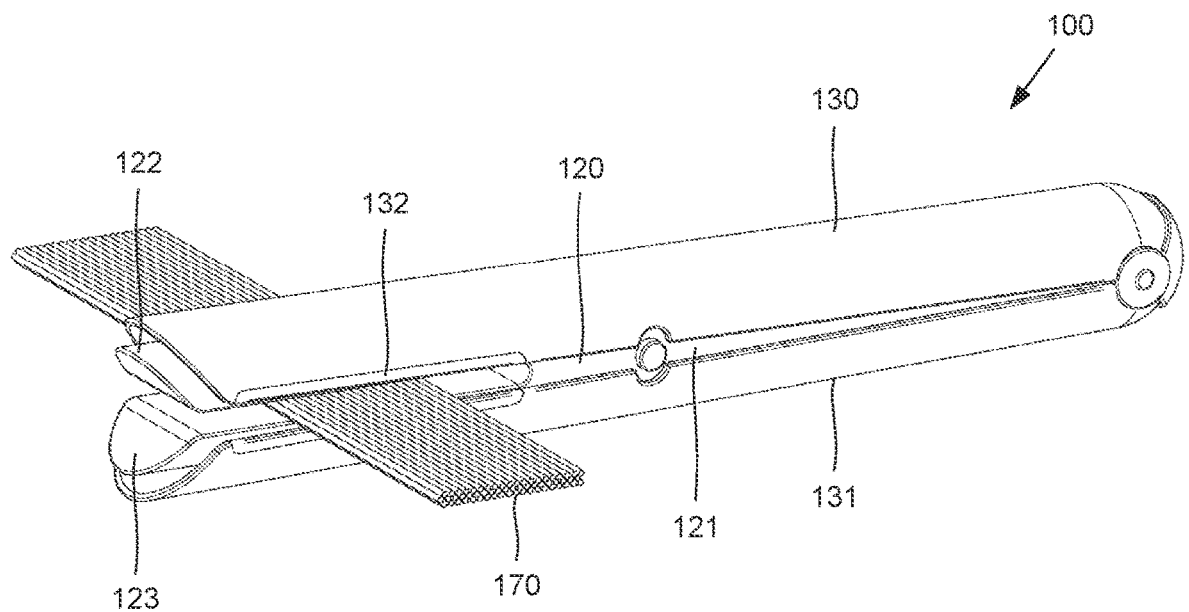
FIG. 3 is a perspective view of a hair styling appliance.
Figure 4:
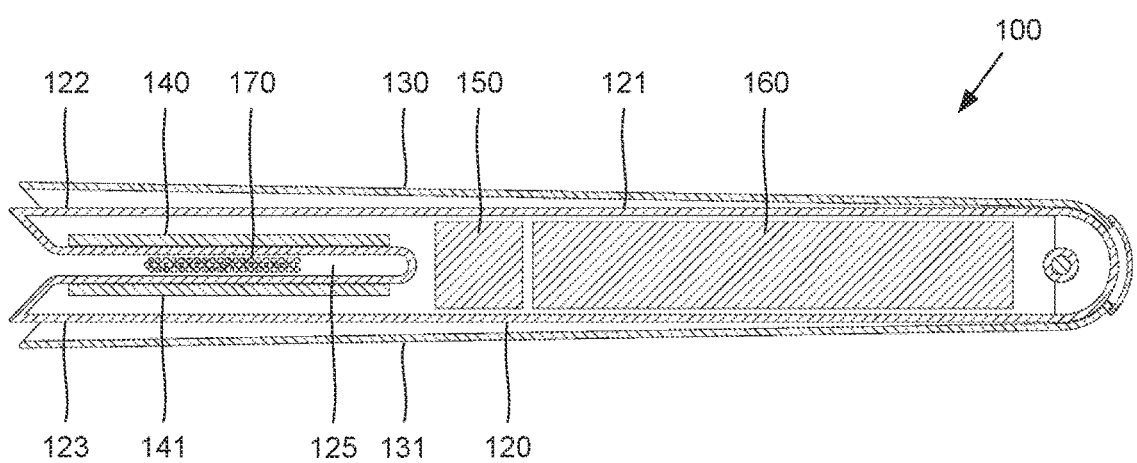
FIG. 4 is a side sectional view through the hair styling appliance.
Figure 5:
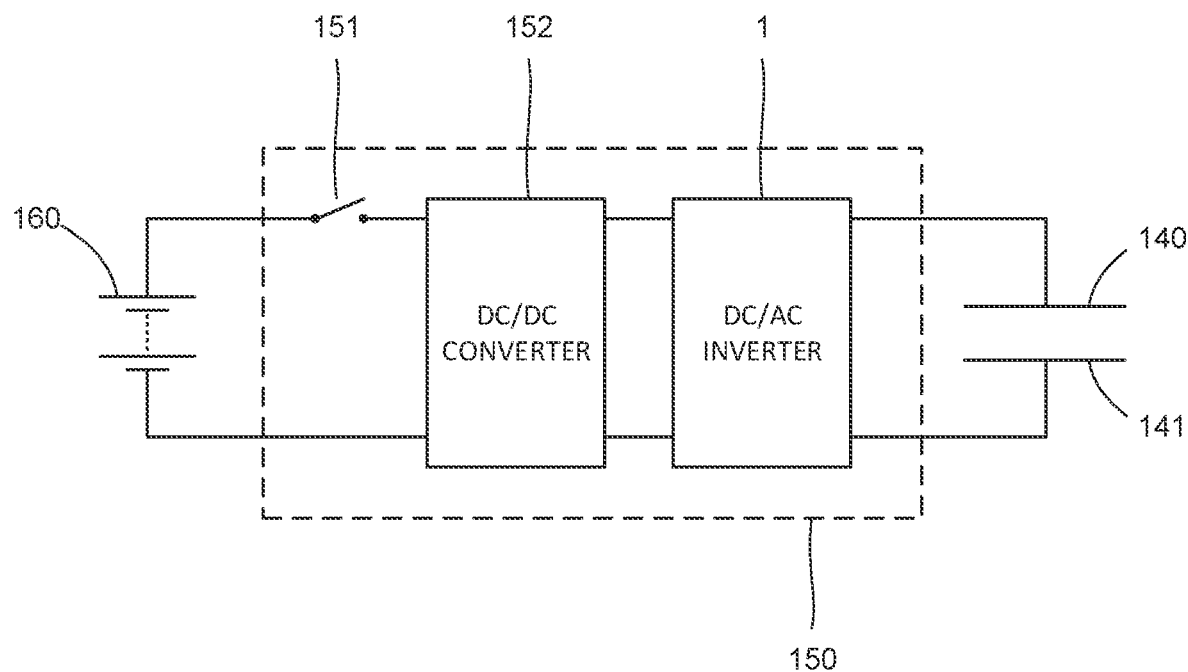
FIG. 5 is a block diagram of a drive unit of the hair styling appliance.

FIGS. 3 to 5 shows a hair styling appliance that incorporates the power inverter of FIG. 1.

The hair styling appliance 100 comprises a body 120, a pair of arms 130,131, a pair of electrodes 140,141, a drive unit 150 and a battery 160.

The body 120 is generally elongated in shape and comprises a tubular section 121 and a pair of prongs 122,123 that extend from the tubular section 121. The tubular section 121 houses the drive unit 150 and the battery 160, and each of the prongs 122,123 houses one of the electrodes 140, 141. A chamber 125 is defined between the two prongs 122,123 into which a section of hair 170 may be received.

Each of the arms 130, 131 is pivotally attached to the body 120. The arms 130, 131 roughly encapsulate the body 120, with each of the arms 130,131 overlying a respective prong 122,123. The arms 130,131 are moveable between an open position (shown in FIGS. 3 and 4) and a closed position. The arms 130,131 are biased in the open position and are moved to the closed position in order to grip the section of hair 170.

Each of the electrodes 140,141 is housed within one of the prongs 122,123 of the body 120. The electrodes 140, 141 are arranged parallel to one another, with the chamber 125 located between the electrodes 140,141.

The drive unit 150 is connected between the battery 160 and the electrodes 140,141, and is operable to apply an alternating voltage to the electrodes 140,141. As illustrated in FIG. 5, the drive unit 150 comprises comprise a switch 151, a DC-to-DC converter 152, and the DC-to-AC inverter 1 of FIG. 1.

The switch 151 is connected between the battery 160 and the DC-to-DC converter 152. The state of the switch 151 depends on the position of the arms 130,131. When the arms 130,131 are in the open position, the switch 151 is open, and when the arms 130,131 are in the closed position, the switch 151 is closed. As a result, no voltage is applied to the electrodes 140,141 when the arms 130,131 are in the open position.

The DC-to-DC converter 152 is coupled between the switch 151 and the DC-to-AC inverter 153. When the switch 151 is closed, the DC-to-DC converter 152 converts the variable voltage of the battery 160 into a regular voltage. That is to say that, as the battery 160 discharges, the DC-to-DC converter 152 outputs a regular voltage to the DC-to-AC inverter 153. As explained below in more detail, the drive unit 150 is operable in a low-power mode and a high-power mode. When the drive unit 150 operates in low-power mode, the DC-to-DC converter 152 outputs a first voltage (e.g. 1 V) to the DC-to-AC inverter 1. When the drive unit 150 operates in high-power mode, the DC-to-DC converter 152 outputs a second, higher voltage (e.g. 50 V) to the DC-to-AC inverter 1. In one example, the DC-to-DC converter 152 may comprise a non-inverting buck-boost converter, which operates in buck mode to provide the first voltage and boost mode to provide the second, higher voltage.

The DC-to-AC inverter 1 is connected between the DC-to-DC converter 52 and the electrodes 40,41. The DC-to-AC inverter 1 converts the DC voltage output by the DC-to-DC converter 152 into an AC output voltage, which is applied to the electrodes 140,141. As a result, an electric field is created between the two electrodes 140,141. Since the voltage applied to the electrodes 140,141 is alternating, the electric field also alternates. The electric field spans the chamber 125 and acts to heat the section of hair 170 within the chamber 125. In particular, the alternating field stimulates the oscillation of polar molecules within the hair 170, particularly water. The oscillation of the polar molecules in turn generates heat.

The amplitude of the output voltage generated by the DC-to-AC inverter 1 is greater than the input voltage. For example, where the DC-to-DC converter 152 outputs a DC voltage of, say, 50 V, the DC-to-AC inverter 1 may output an AC voltage of 100 V. This then has the advantage of generating a stronger electric field (which is directly proportional to the applied voltage) between the electrodes 140,141, which in turn results in improved heating and styling of the hair 170.

The drive unit 150 is operable in one of three modes: power-off mode, low-power mode and high-power mode.

When the switch 151 is open, the drive unit 150 operates in power-off mode. No voltage and therefore no power is supplied to the electrodes 140,141. When the switch 151 is closed, the drive unit 150 transitions from power-off mode to low-power mode.

When operating in low-power mode, the drive unit 150 determines whether hair is present within the chamber 125. This may be achieved in a number of different ways. For example, the drive unit 150 may comprise an optical sensor, an ultrasonic sensor or capacitive sensor for sensing the presence of hair. Alternatively, the drive unit 150 may use the electrodes 140,141 to determine if hair is present. This then has the advantage that the presence of hair may be determined without the additional cost and complexity of integrating a sensor.

The impedance of the electrodes 140,141 depends on the medium between the electrodes 140,141. In particular, the resistance is inversely proportional to the electrical conductivity of the medium, and the capacitance is directly proportional to the dielectric constant of the medium. The impedance of the electrodes 140,141 may therefore be used to determine if hair is present within the chamber 125.

In order to obtain a measure of the impedance of the electrodes 140, 141, the drive unit 150 applies a first voltage to the electrodes 140,141. More particularly, the DC-to-DC converter 152 outputs a first DC voltage, which the DC-to-AC inverter 1 converts into a first AC voltage. For example, the first DC voltage may be 1 V and the first AC voltage may be 2 V. Since the DC-to-AC inverter 1 is a voltage source inverter, any changes in the impedance of the electrodes 140,141 may be sensed as changes in the current drawn by the electrodes 140,141. Changes in the impedance of the electrodes 140,141 may also translate as changes in voltages at certain nodes within the DC-to-AC inverter 1. The drive unit 150 may therefore sense one or more electrical or electromagnetic parameters (e.g. current and/or voltage) that are indicative of the impedance of the electrodes 140,141, and then use these electrical or electromagnetic parameters to determine the presence of hair.

If the drive unit 150 determines that hair is not present, the drive unit 50 continues to operate in low-power mode. In the event that the drive unit 150 determines that hair is present, the drive unit 150 transitions from low-power mode to high-power mode.

In high-power mode, the drive unit 150 applies a second, higher voltage to the electrodes 140,141. More particularly, the DC-to-DC converter 152 outputs a second higher DC voltage, which the DC-to-AC inverter 1 converts into a second higher AC voltage. For example, the second DC voltage may be 50 V and the amplitude of the second AC voltage may be 100 V. The electrical power drawn by the electrodes 140,141 is therefore significantly higher in high-power mode. With the example voltages provided, the electrical power drawn by the electrodes 140,141 (for a given impedance) in high-power mode is around 2500 times greater than that in low-power mode.

Whilst in high-power mode, the drive unit 150 continues to determine the presence of hair between the electrodes 140,141, e.g. by sensing an electrical or electromagnetic parameter(s) indicative of the impedance of the electrodes 140,141. In the event that the drive unit 150 determines that hair is no longer present between the electrodes 140,141, the drive unit 150 transitions from high-power mode to low-power mode.

During use of the appliance 100, a user may hold the appliance 100 in one hand and grip a section of hair 170 in the other hand. With the arms 130,131 biased in the open position, the section of hair 170 is inserted into the chamber 25 by sliding the prongs 122, 123 over the section of hair 170. With the arms 130,131 in the open position, the switch 151 of the drive unit 150 is open and the drive unit 150 operates in power-off mode.

With the section of hair 170 in the chamber 125, the user squeezes the arms 130,131 together, thereby causing the arms 130,131 to move to the closed position. With the arms 130,131 in the closed position, the section of hair 170 is gripped between the two arms 130,131. With the arms 130,131 in the closed position, the switch 151 of the drive unit 150 is closed and thus the drive unit 150 transitions to low-power mode.

In low-power mode, the drive unit 150 applies the first AC voltage (e.g. 2 V) to the electrodes 140,141 and determines whether hair is present based on the impedance of the electrodes 140,141. Upon determining that hair is present, the drive unit 150 transitions to high-power mode. The drive unit 150 then applies the second, higher AC voltage (e.g. 100 V) to the electrodes 140,141, and the resulting electric field heats the hair 170.

The user may pull the appliance 100 along the full length of the section of hair 170. At the end of the pass, when the section of hair 170 has been pulled through the appliance 100, the drive unit 150 determines that hair is no longer present in the chamber 125 and transitions to low-power mode. The user then opens the arms 130,131 ready for the next section of hair, at which point the drive unit 150 transitions to power-off mode.

The DC-to-AC inverter 1 is a voltage source inverter and applies the same alternating voltage to the electrodes 140, 141, irrespective of the impedance of the electrodes 140, 141. This then has a couple of advantages. First, the same electric field is generated irrespective of the amount of hair or the characteristics of the hair (e.g. moisture content) within the chamber 125. Second, by operating as a voltage source, the electrodes 140,141 are free to draw a current that depends on the impedance of the electrodes 140,141. For example, when the impedance is higher (e.g. when a small amount of hair is located in the chamber 125 or the hair is dry), a smaller current and therefore a smaller power is drawn by the electrodes 140,141. Conversely, when the impedance is lower (e.g. when a large amount of hair is located in the chamber 125 or the hair is damp), a higher current and therefore a higher power is drawn by the electrodes 140,141. The appliance 100 is therefore self-regulating in that the electrodes 140,141 automatically draw power according to the hair within the chamber 125. As a result, the efficiency of the appliance 100 may be improved and/or more consistent heating may be achieved. By contrast, if the drive unit 50 were to include a current source inverter or a power source inverter, the electrodes 140,141 would draw the same current or power irrespective of the impedance of the electrodes 140,141. Consequently, when there is a small amount of hair in the chamber 125, excessive heating of the hair and/or arcing across the electrodes 140,141 may occur. Conversely, when there is a large amount of hair in the chamber 125, heating of the hair may be relatively poor.

A further advantage of employing a voltage source inverter is that effective coupling of the energy of the electric field with the hair may be achieved at a single frequency, irrespective of changes in the impedance of the electrodes 140, 141 (i.e. irrespective of the amount or characteristics of the hair). By contrast, with an inverter that operates as a current source or power source, it may be desirable or indeed necessary to apply a voltage at different frequencies in order to achieve effective energy coupling and/or and avoid excessively high voltages across the electrodes. Furthermore, the impedance of the electrodes 140, 141 depends on the frequency of the alternating voltage. Accordingly, where the impedance of the electrodes 140,141 is used to determine whether hair is present in the chamber 125, a more reliable determination may be made when a voltage having a constant frequency is applied to the electrodes 40,41.

The electrodes 140,141 are housed within the prongs 122,123 of the body 120, which do not move. The hair 170 is then gripped and tensioned by the arms 130,131. The electrodes 140,141 therefore have a fixed spacing, which has several potential advantages. First, by having a fixed spacing, a more consistent electric field strength (which is inversely proportional to the electrode spacing) may be achieved, resulting in more consistent heating of the hair. Second, where the impedance of the electrodes 140,141 is used to determine whether hair is present in the chamber 125, a more reliable determination may be made. The capacitance and thus the impedance of the electrodes 140, 141 depends on both the spacing of the electrodes 140,141 and the dielectric constant of the medium between the electrodes 140,141. Accordingly, by having a fixed electrode spacing, a more reliable determination of the type of medium may be made. Third, the electrode spacing may be sized so as to achieve a relatively strong electric field whilst also avoiding arcing or corona discharge.

However, a potential disadvantage with this arrangement is that, in order to achieve a strong electric field strength within the chamber 125, the electrode spacing and thus the chamber 25 must be relatively shallow (e.g. between 1 mm and 10 mm). Having a shallow chamber may present challenges when trying to insert a section of hair into the chamber 125. In order to mitigate this difficulty, the prongs 122,123 may also move, or the prongs 122,123 may be omitted and the electrodes 140, 141 may instead be housed within the arms 130,131 of the appliance 100, as will now be described with reference to FIG. 6.

Figure 6:
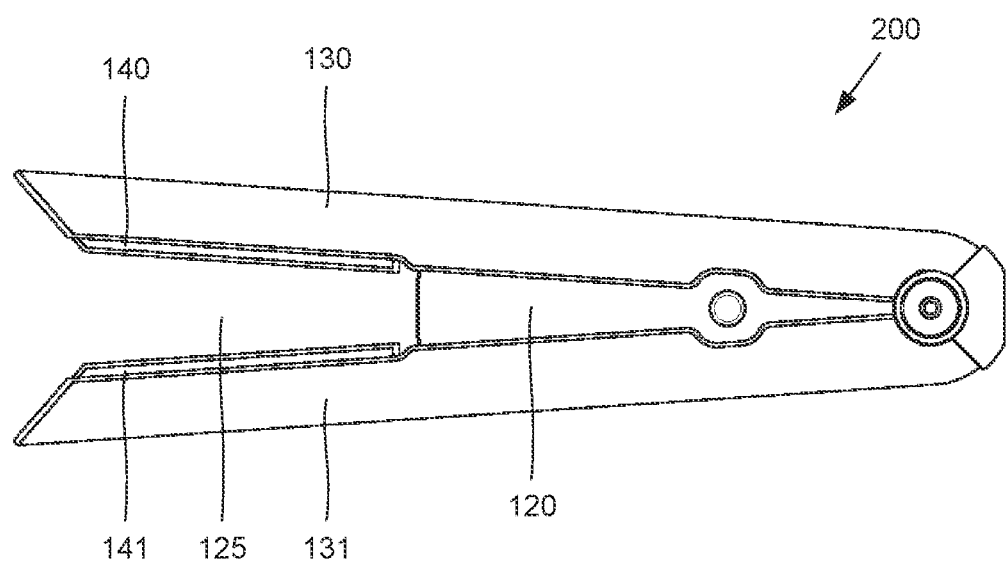
FIG. 6 is a side view of a further hair styling appliance.

FIG. 6 illustrates an alternative hair styling appliance 200 in which the prongs are omitted from the body 120, and the electrodes 140,141 are housed within the arms 130,131 of the appliance 200. The chamber 125 is then defined between the two arms 130,131. This then has the advantage that, when the arms 130, 131 are in the open position, as shown in FIG. 6, the chamber 125 has a relatively wide mouth for receiving a section of hair. When the arms 130,131 are moved to the closed position, the arms 130,131 act to grip the hair.

The electrodes 140,141 have a predefined minimum spacing when the arms 130,131 are in the closed position and there is no hair between the arms 130,131. This minimum spacing may be defined so as to achieve a relatively strong electric field whilst avoiding arcing or corona discharge. During use, the spacing between the electrodes 140,141 may be greater than the predefined minimum spacing. For example, a relatively thick section of hair may be gripped by the arms 130,131. The capacitance and thus the reactance of the electrodes 140,141 depends on the spacing of the electrodes 140,141. Consequently, as the spacing of the electrodes 140,141 increases, the DC-to-AC inverter 1 is detuned slightly and thus the efficiency of the inverter 1 decreases. In order to compensate for this, the DC-to-AC inverter 1 may comprise inductors that are mutually coupled and have a coupling coefficient that varies in response to changes in the electrode spacing. As a result, changes in the capacitance of the electrodes 140,141 may be offset by changes in the mutual inductance such that the net change in reactance is reduced.

Figure 7:
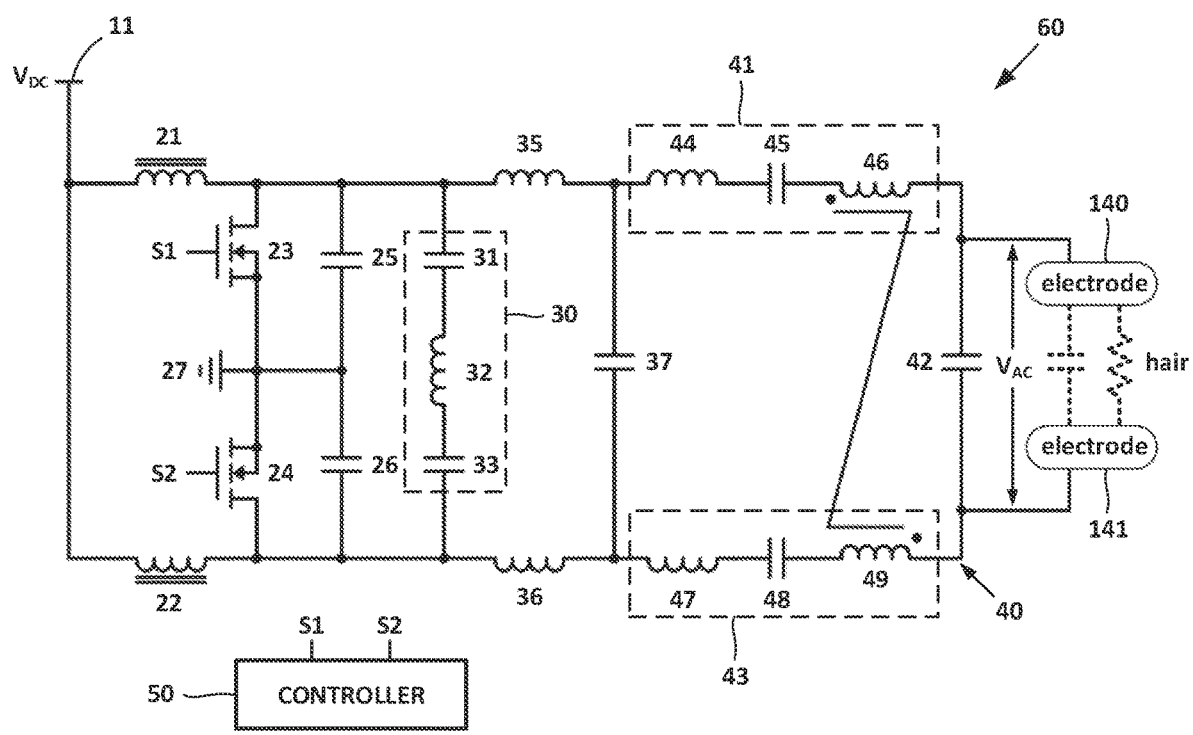
FIG. 7 is a circuit diagram of a further power inverter connected to electrodes.

FIG. 7 illustrates an alternative power inverter 60 connected to electrodes 140,141. The power inverter 60 is identical to that of FIG. 1 with the exception that the further inductors 46,49 of the sub-networks 41,43 are mutually coupled. The coupling coefficient of the further inductors 46,49 varies in response to changes in the spacing of the electrodes 140,141. More particularly, the coupling coefficient decreases in response to an increase in the spacing. As the spacing of the electrodes 140,141 increases, the capacitance decreases and thus the reactance increases. By decreasing the coupling coefficient in response to an increase in the spacing, the mutual inductance and thus the reactance decreases. As a result, the net change in reactance is reduced.

The further inductors 46,49 (i.e. those inductors which are mutually coupled) may be moveable relative to one another in order to vary the coupling coefficient. For example, each of the further inductors 46,49 may be housed within a respective arm 130,131 of the appliance 200. Consequently, as the spacing of the electrodes 140,141 increases, so too does the separation of the further inductors 46,49. Since the coupling coefficient is inversely proportional to the separation of the further inductors 46,49, the coupling coefficient decreases as the spacing of the electrodes 140,141 increases, and vice versa. This then provides a convenient means for varying the coupling coefficient in response to changes in the spacing of the electrodes 140,141.

If the coupling coefficient is excessively high, it is possible that issues may arise with the stability of the inverter 60 during significant power transience, e.g. during power on and off. Accordingly, it may therefore be beneficial to have a coupling coefficient that is no greater than 0.5.

Where the inverter 60 comprises mutually-coupled inductors, the capacitance C8 of the output capacitor is defined as:

$$C8 = \frac{1}{\omega_S^2(L8 + L9 + 2k\sqrt{L8 \cdot L9})} \pm 20\%$$

where k is the maximum coupling coefficient of the further inductors 46,49 (i.e. the value of the coupling coefficient when the electrodes 140,141 are at a minimum spacing), L8 and L9 are the inductances of the further inductors 46,49, and $\omega_S$ is the switching frequency of the switches 23,24.

Figure 8:
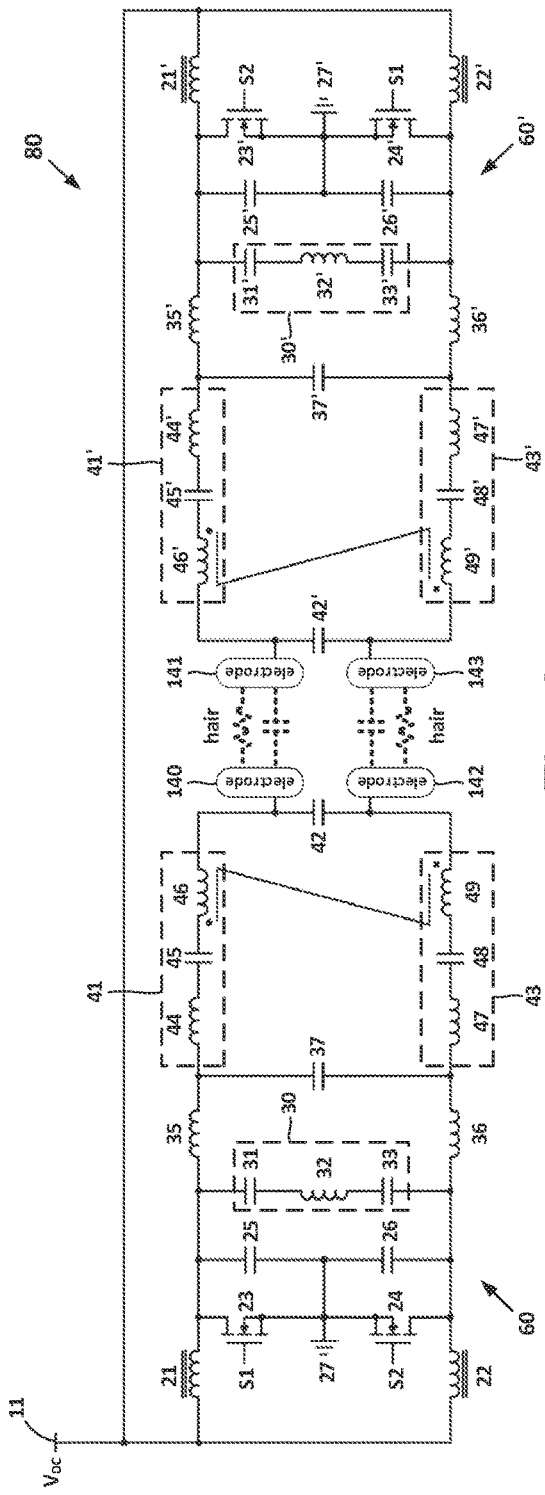
FIG. 8 is a circuit diagram of a power system connected to electrodes.

FIG. 8 illustrates a power system 80 comprising a first power inverter 60 and a second power inverter 60'. Each of the power inverters 60,60' is identical to that shown in FIG. 7. The power inverters 60,60' have a common controller (not shown) for controlling the switches 23,24,23'24'. The first power inverter 60 outputs a first alternating voltage, and the second power inverter 60' outputs a second alternating voltage. The second alternating voltage has the same frequency as the first alternating voltage, but has a phase angle of 180 degrees relative to the first alternating voltage. This may be achieved by means of the switching signals S1, S2 generated by the controller. For example, the first switching signal S1 may be used to control the first switch 23 of the first power inverter 60 and the second switch 24' of the second power inverter 60', and the second switching signal S2 may be used to control the second switch 24 of the first power inverter 60 and the first switch 23' of the second power inverter 60'.

The first power inverter 60 is connected to a pair of first electrodes 140, 142, and the second power inverter 60' is connected to a pair of second electrodes 141,143. Each of the first electrodes 140,142 opposes one of the second electrodes 141,143. The appliance therefore comprises two pairs of opposing electrodes, each pair of opposing electrodes comprising a first electrode 140,142 connected to the first power inverter 60, and a second electrode 141,143 connected to the second power inverter 60'.

For a given input voltage, the power system 80 of FIG. 8 is capable of generating a higher voltage across each pair of electrodes 140,141;142,143 in comparison to the single inverter 60 of FIG. 7. As a consequence of the higher voltage, the electric field generated between the electrodes 140,141;142,143 has a higher field strength. The power system 80 is therefore capable of transferring a higher output power to the load, which in this example is hair. The same output power could be achieved with the single inverter 60 of FIG. 7 by employing a higher input voltage. However, the single inverter 60 would then suffer from higher power losses. With the power system 80 of FIG. 8, a given output power can be achieved more efficiently, albeit at the expense of a higher number of components.

Figure 9:
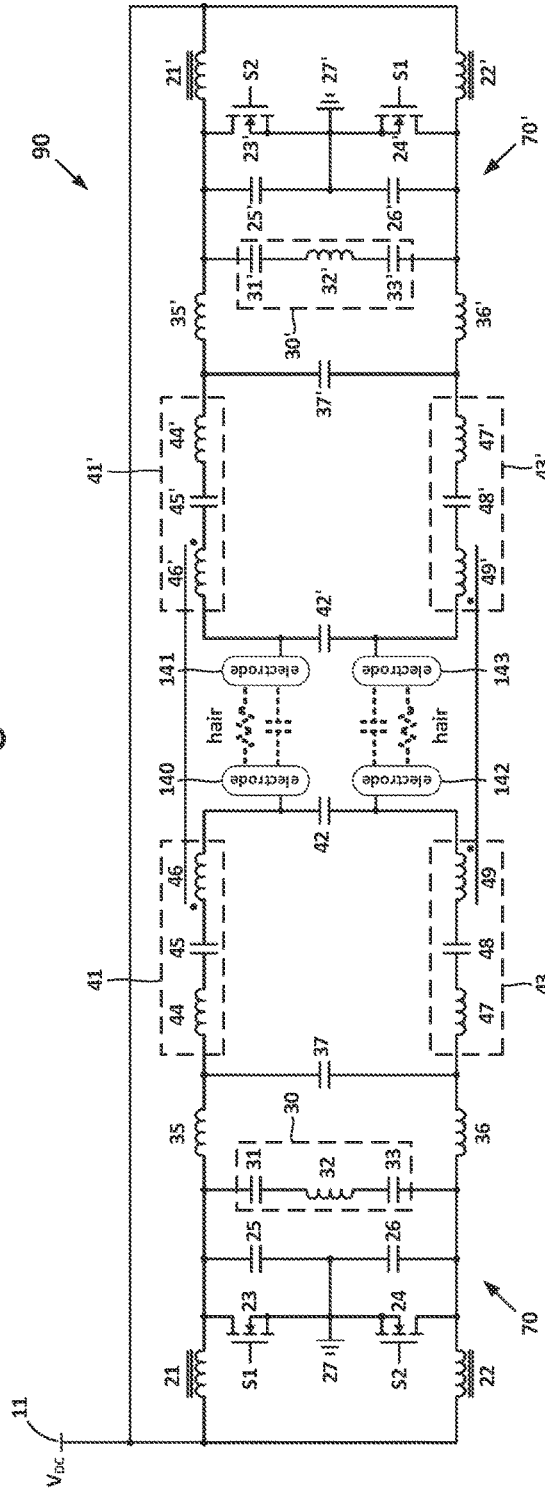
FIG. 9 is a circuit diagram of a further power system connected to electrodes.

Each of the inverters 60,60' comprises mutually-coupled inductors. As noted above, the mutual inductance may improve the efficiency of the system 80 in the event that the spacing of the electrodes 140,141;142,143 changes. In the particular example shown in FIG. 8, the further inductor 46,46' of the first sub-network 41,41' of each inverter 60,60' is mutually coupled to the further inductor 49,49' of the second sub-network 43,43'. FIG. 9 shows an alternative power system 90 in which the further inductors 44,44' of the first sub-networks 41,41' of the two inverters 70,70' are mutually coupled, and the further inductors 49,49' of the second sub-networks 43,43' of the two inverters 70,70' are mutually coupled. With the exception of the choice of inductors that are mutually coupled, the inverters 70,70' of FIG. 9 are unchanged from those of FIG. 8. The topologies of the power systems 80,90 of FIGS. 8 and 9 are electrically equivalent. However, depending on the particular appliance in which the power system is incorporated, one of the two power systems 80,90 may be easier to package within the appliance.

Although the power systems 80,90 illustrated in FIGS. 8 and 9 are connected to electrodes, it will be appreciated that the power systems 80,90 may be connected to alternative components and/or loads, according to the particular application. For example, the power system 80,90 may be connected to coils of an induction heater or wireless charger. Furthermore, whilst mutually-coupled inductors have been described in the context of electrodes having a variable spacing, the provision of mutually-coupled inductors may be used in other applications for which the reactance of the load may vary. In particular, as reactance of the load varies, the coupling coefficient of the mutually-coupled inductors may also vary such that the net change in reactance is reduced.

Whilst particular examples and embodiments have been described, it should be understood that various modifications may be made without departing from the scope of the invention as defined by the claims.

The invention claimed is:
1. A power inverter comprising:
an input for connection to a DC voltage;
a first inductor and a second inductor, each of the first and the second inductors having a first terminal connected to the input and a second terminal;
a first switch having a first terminal connected to the second terminal of the first inductor and a second terminal connected to a ground;
a second switch having a first terminal connected to the second terminal of the second inductor and a second terminal connected to the ground;
a first capacitor connected in parallel to the first switch;
a second capacitor connected in parallel to the second switch;
a first network having a first terminal connected to the first terminal of the first switch and a second terminal connected to the first terminal of the second switch, the first network comprising a third capacitor, a third inductor and a fourth capacitor connected in series;
a fourth inductor having a first terminal connected to the first terminal of the first network and a second terminal;
a fifth inductor having a first terminal connected to the second terminal of the first network and a second terminal;
a fifth capacitor having a first terminal connected to the second terminal of the fourth inductor, and a second terminal connected to the second terminal of the fifth inductor;
a second network having a first terminal connected to the first terminal of the fifth capacitor and a second terminal connected to the second terminal of the fifth capacitor, the second network comprising a first sub-network, an output capacitor, and a second sub-network connected in series, wherein each of the first and second sub-networks comprises a capacitor and an inductor connected in series;
a pair of outputs, each one of the pair of outputs connected to a respective terminal of the output capacitor; and
a controller for controlling the first and second switches, wherein the first network has a resonant frequency of $\omega_1$, the controller switches the first and second switches at a switching frequency of $\omega_S$, and a ratio of $\omega_1/\omega_S$ is 0.64±20%.

2. The power inverter as claimed in claim 1, wherein the controller switches the first and second switches at duty cycles of 0.5±5%.

3. The power inverter as claimed in claim 1, wherein ratios of one or more of (i) capacitances of the first and second capacitors, (ii) capacitances of the third and fourth capacitors, (iii) inductances of the fourth and fifth inductors, and (iv) inductances of the inductors of the first and second sub-networks are 1.0±5%.

4. The power inverter as claimed in claim 1, wherein the controller switches the first and second switches at a switching frequency of at least 10 Mhz.

5. The power inverter as claimed in claim 1, wherein the first capacitor has a capacitance C1, the second capacitor has a capacitance C2, the third capacitor has a capacitance C3, the fourth capacitor has a capacitance C4, and ratios C3/C1 and C4/C2 are each 1.395±20%.

6. The power inverter as claimed in claim 1, wherein the third inductor has an inductance L3, the fourth inductor has an inductance L4, the fifth inductor has an inductance L5, the inductor of the first sub-network has an inductance L6, and the inductor of the second sub-network has an inductance L7, where L6=L4−0.145*L3±20% and L7=L5−0.145*L3±20%.

7. The power inverter as claimed in claim 1, wherein the controller switches the first and second switches at a switching frequency of $\omega_S$, the fifth capacitor has a capacitance C5, the inductor of the first sub-network has an inductance L6, and the inductor of the second sub-network has an inductance L7, where each of L6 and L7 is equal to $2/(\omega_S^2 \cdot C5)$ ±20%.

8. The power inverter as claimed in claim 1, wherein each of the first and second sub-networks comprises a further inductor connected in series with the inductor and the capacitor, and the further inductors of the first and second sub-networks are mutually coupled.

9. The power inverter as claimed in claim 8, wherein the further inductors have a coupling coefficient of 0.5 or less.

10. The power inverter as claimed in claim 8, wherein the further inductor of the first sub-network has an inductance L8, the further inductor of the second sub-network has an inductance L9, the further inductors have a coupling coefficient k, and the output capacitor has a capacitance C8, where $$C8 = \frac{1}{\omega_S^2(L8 + L9 + 2k\sqrt{L8 \cdot L9})} \pm 20\%.$$

11. The power inverter as claimed in claim 8, wherein the further inductors of the first and second sub-networks are mutually coupled according to a coupling coefficient, and the coupling coefficient is adjustable.

12. The power inverter as claimed in claim 8, wherein the further inductors of the first and second sub-networks are mutually coupled according to a coupling coefficient, and the further inductors are moveable relative to one another to adjust the coupling coefficient.

13. A power system comprising the power inverter as claimed in claim 1, and a second power inverter,
   wherein the power inverter outputs a first alternating voltage, the second power inverter outputs a second alternating voltage, the second alternating voltage has a same frequency as the first alternating voltage, and the second alternating voltage has a phase angle of 180 degrees relative to the first alternating voltage.

14. A haircare styling appliance comprising a plurality of electrodes and the power inverter as claimed in claim 1, wherein each of the plurality of electrodes is connected to a respective output of the pair of outputs.

15. The hair styling appliance as claimed in claim 14, wherein the appliance comprises a body having a pair of arms, the pair of arms are moveable relative to one another, and the plurality of electrodes are attached to or housed within the pair of arms.

\* \* \* \* \*